(12) United States Patent
Hao et al.

(10) Patent No.: US 12,438,203 B2
(45) Date of Patent: Oct. 7, 2025

(54) DISTRIBUTED BATTERY MANAGEMENT FOR A VEHICLE

(71) Applicant: GM Global Technology Operations LLC, Detroit, MI (US)

(72) Inventors: Lei Hao, Troy, MI (US); Yue-Yun Wang, Troy, MI (US); Steven Earl Muldoon, Royal Oak, MI (US); Michael P. Barker, Troy, MI (US); Yongjie Zhu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 537 days.

(21) Appl. No.: 17/939,529

(22) Filed: Sep. 7, 2022

(65) Prior Publication Data
US 2024/0079662 A1    Mar. 7, 2024

(51) Int. Cl.
*H01M 10/42* (2006.01)
*B60L 58/10* (2019.01)
*H01M 10/48* (2006.01)
*H01M 50/249* (2021.01)
*H01M 50/267* (2021.01)

(52) U.S. Cl.
CPC ......... *H01M 10/4257* (2013.01); *B60L 58/10* (2019.02); *H01M 10/482* (2013.01); *H01M 50/267* (2021.01); *H01M 2010/4271* (2013.01); *H01M 2010/4278* (2013.01); *H01M 50/249* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 11,225,169 B2 | 1/2022 | Wang et al. | |
| 11,610,475 B2* | 3/2023 | Valentini | A47L 9/2884 |
| 2021/0129706 A1* | 5/2021 | Wang | B60L 58/22 |
| 2022/0328891 A1* | 10/2022 | Lu | G01K 11/32 |
| 2023/0139353 A1* | 5/2023 | Monfort | B60L 58/16 |
| | | | 307/10.1 |
| 2023/0141979 A1* | 5/2023 | Rigelsford | H01M 10/4257 |
| | | | 429/61 |
| 2023/0347787 A1* | 11/2023 | Lohe | B60L 50/66 |

* cited by examiner

*Primary Examiner* — Scott J. Chmielecki
(74) *Attorney, Agent, or Firm* — CANTOR COLBURN LLP

(57) ABSTRACT

An example method includes receiving, at a module management unit (MMU) associated with a battery cell, a battery cell parameter measurement associated with the battery cell. The MMU in is communication with a battery radio frequency module via a first link. The method further includes performing, by the MMU, a first function based at least in part on the battery cell parameter measurement to generate a first signal, and transmitting, from the MMU, the first signal to the battery radio frequency module via the first link. The method further includes performing, by the battery radio frequency module, a second function based at least in part on the first signal to generate a second signal. The method further includes transmitting, from the battery radio frequency module, the second signal to a controller, and performing, by the controller, a third function based at least in part on the second signal.

20 Claims, 7 Drawing Sheets

DISTRIBUTED BATTERY MANAGEMENT FOR A VEHICLE

INTRODUCTION

The present disclosure relates to vehicles and particularly to distributed battery management for a vehicle.

Modern vehicles (e.g., a car, a motorcycle, a boat, or any other type of automobile) may be equipped with one or more electric motors, such as to drive a wheel(s) of the vehicle. For example, an electric motor can be mechanically coupled to a wheel of a vehicle to apply rotational force to the wheel, creating a driveline. In some examples, a vehicle can include multiple electric motors. The electric motor(s) receives electric power from a rechargeable energy storage system (RESS), which can include one or more batteries for storing electric power. The batteries can be recharged, for example, using a charging station. The RESS can also provide electric power to other systems of the vehicle (e.g., climate control systems, infotainment systems, etc.).

SUMMARY

In one exemplary embodiment, a method for distributed battery management of a vehicle is provided. The method includes receiving, at a module management unit associated with a battery cell, a battery cell parameter measurement associated with the battery cell. The module management unit in is communication with a battery radio frequency module via a first link. The method further includes performing, by the module management unit, a first function based at least in part on the battery cell parameter measurement to generate a first signal. The method further includes transmitting, from the module management unit, the first signal to the battery radio frequency module via the first link. The method further includes performing, by the battery radio frequency module, a second function based at least in part on the first signal to generate a second signal. The method further includes transmitting, from the battery radio frequency module, the second signal to a controller. The method further includes performing, by the controller, a third function based at least in part on the second signal.

In addition to one or more of the features described herein, or as an alternative, further embodiments of the method may include that the module management unit is one of a plurality of module management units.

In addition to one or more of the features described herein, or as an alternative, further embodiments of the method may include that the plurality of module management units are in communication with the battery radio frequency module via wireless links.

In addition to one or more of the features described herein, or as an alternative, further embodiments of the method may include that one of the plurality of module management units is in communication with the battery radio frequency module via a wired link, and wherein the one of the plurality of module management units is in communication with at least one other of the plurality of module management units via a wired link.

In addition to one or more of the features described herein, or as an alternative, further embodiments of the method may include transmitting, from the battery radio frequency module, the second signal to the module management unit.

In addition to one or more of the features described herein, or as an alternative, further embodiments of the method may include that the first link is a direct link between the module management unit and the battery radio frequency module.

In addition to one or more of the features described herein, or as an alternative, further embodiments of the method may include that the first link is a radio frequency link.

In addition to one or more of the features described herein, or as an alternative, further embodiments of the method may include that the first link is a wired link between the module management unit and the battery radio frequency module via another module management unit.

In addition to one or more of the features described herein, or as an alternative, further embodiments of the method may include that the module management unit is associated with a plurality of battery cells.

In addition to one or more of the features described herein, or as an alternative, further embodiments of the method may include that the module management unit is associated with a battery pack, the battery pack comprising the battery cell.

In addition to one or more of the features described herein, or as an alternative, further embodiments of the method may include that the first function processes the battery cell parameter measurement prior to transmitting the first signal to the battery radio frequency module, wherein the first signal is a result of processing the battery cell parameter measurement.

In addition to one or more of the features described herein, or as an alternative, further embodiments of the method may include: transmitting, from the controller, a fourth signal including measured and calculated battery pack signals to the battery radio frequency module; and transmitting, from the battery radio frequency module, the fourth signal to the module management unit.

In another exemplary embodiment a system for distributed battery management of a vehicle is provided. The system includes a first module management unit associated with a first battery cell and to perform a first function based at least in part on a first battery cell parameter measurement associated with the first battery cell. The system further includes a second module management unit associated with a second battery cell and to perform a second function based at least in part on a second battery cell parameter measurement associated with the second battery cell. The system further includes a battery radio frequency module to perform a third function based at least in part on at least one of a first signal received from the first module management unit or a second signal received from the second module management unit. The system further includes a controller to perform a fourth function based at least in part on a third signal received from the battery radio frequency module. The first module management unit is communicatively coupled to the battery radio frequency module via a first link. The second module management unit is communicatively coupled to the battery radio frequency module via a second link. The battery radio frequency module is communicatively coupled to the controller via a third link. The first signal is transmitted from the first module management unit to the battery radio frequency module via the first link. The second signal is transmitted from the second module management unit to the battery radio frequency module via the second link.

In addition to one or more of the features described herein, or as an alternative, further embodiments of the system may include that the third signal is transmitted from the battery radio frequency module to the controller via the third link.

In addition to one or more of the features described herein, or as an alternative, further embodiments of the system may include that the first link is a first radio frequency link, wherein the second link is a radio frequency link, and wherein the third link is a controller area network link.

In addition to one or more of the features described herein, or as an alternative, further embodiments of the system may include that the first battery cell has a first battery chemistry type, and wherein the second battery cell has a second battery chemistry type that differs from the first battery chemistry type.

In another exemplary embodiment a system for distributed battery management of a vehicle is provided. The system includes a first module management unit associated with a first battery cell and to perform a first function based at least in part on a first battery cell parameter measurement associated with the first battery cell. The system further includes a second module management unit associated with a second battery cell and to perform a second function based at least in part on a second battery cell parameter measurement associated with the second battery cell. The system further includes a battery radio frequency module to perform a third function based at least in part on at least one of a first signal received from the first module management unit or a second signal received from the second module management unit. The system further includes a controller to perform a fourth function based at least in part on a third signal received from the battery radio frequency module. The first module management unit is communicatively coupled to the battery radio frequency module via a first link. The first module management unit is communicatively coupled to the second module management unit via a second link. The battery radio frequency module is communicatively coupled to the controller via a third link. The second signal is transmitted from the second module management unit to the first module management unit via the second link. The first signal and the second signal are transmitted from the first module management unit to the battery radio frequency module via the first link.

In addition to one or more of the features described herein, or as an alternative, further embodiments of the system may include that the third signal is transmitted from the battery radio frequency module to the controller via the third link.

In addition to one or more of the features described herein, or as an alternative, further embodiments of the system may include that the first link is a wired link, wherein the second link is a radio frequency link, and wherein the third link is a controller area network link.

In addition to one or more of the features described herein, or as an alternative, further embodiments of the system may include that the first battery cell has a first battery chemistry type, and wherein the second battery cell has a second battery chemistry type that differs from the first battery chemistry type.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
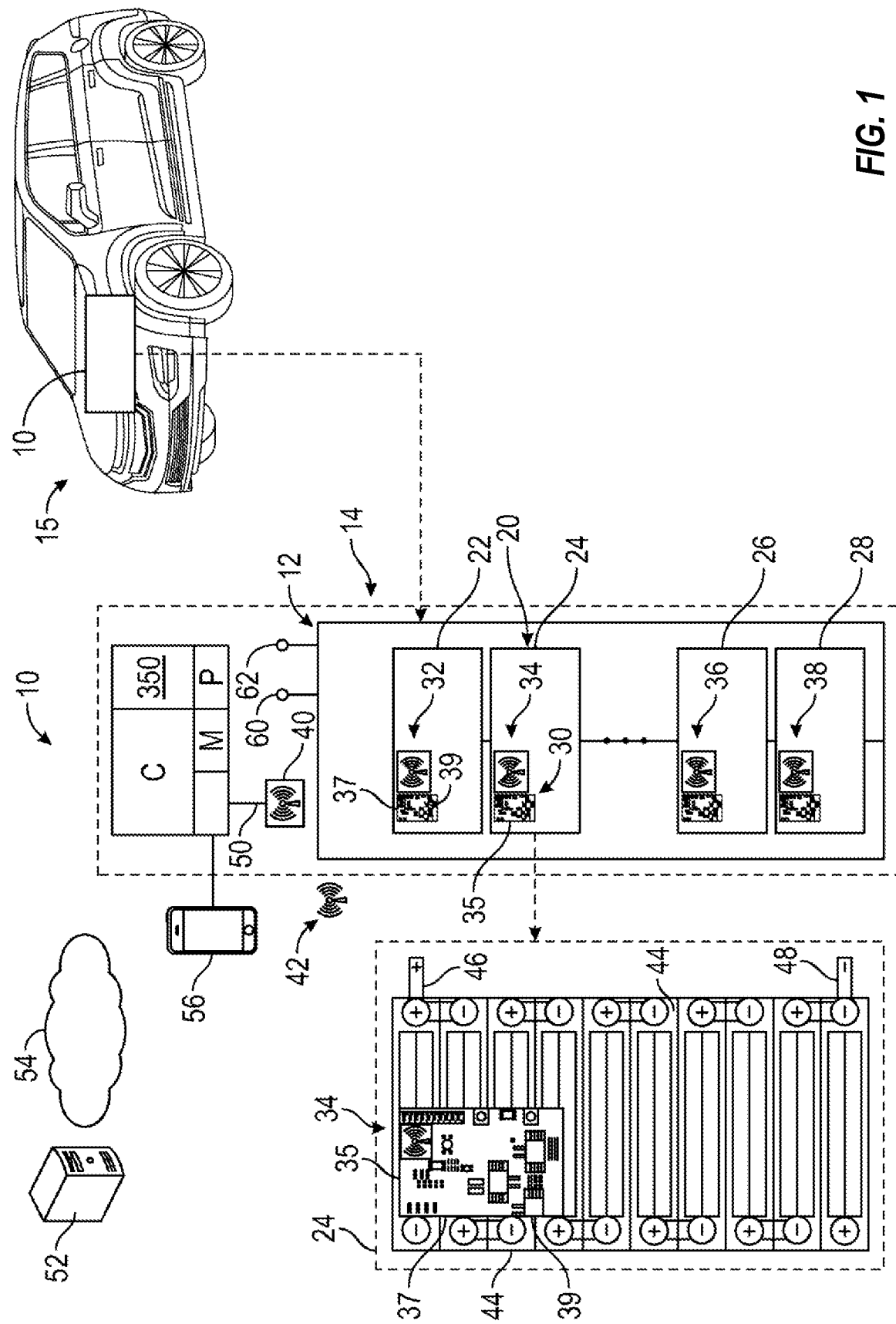
FIG. 1 is a schematic illustration of a management system having a rechargeable energy storage device and a supervisory controller according to one or more embodiments described herein.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

One or more embodiments described herein provide for distributed battery management for a vehicle, such as an electric vehicle. Batteries can be used to provide electrical power to systems and devices of a vehicle. Examples of such systems and devices can include climate control systems, infotainment systems, heated seats, heated steering wheels, window defoggers, and/or the like including combinations and/or multiples thereof. Battery systems can include multiple batteries or cells. It is desirable to manage electric power usage to improve efficiency of consumption of electric power. Managing electric power usage can include battery management. Conventional approaches to battery management use a centralized approach that rely on a centralized controller to maintain the multiple batteries or cells. For example, data about batteries can be sent from respective module management modules associated with the batteries, and the centralized controller makes decisions about how to manage the batteries, then transmits commands back to the module management modules to implement the commands, or communicate battery status to vehicles and customers, such as remaining state of charge or vehicle range. That is, decision making logic resides on the centralized controller according to conventional battery management techniques. However, such approaches are slow (e.g., due to the back-and-forth communication nature of such approaches, due to the extensive amount of processing to be performed by the centralized controller, and/or the like including combinations and/or multiples thereof), require significant bandwidth between the centralized controller and the module management units, and require significant processing to be performed by the centralized controller. Further it is not convenient for flexibly configured battery packs of range extend vehicles, or second use and recycling of battery modules since battery information such as life, history, material chemistry, etc., is stored in the centralized controller.

One or more embodiments described herein address these and other shortcomings by providing distributed battery management for a vehicle. Particularly, one or more embodiments described herein, implements a multi-layer control scheme that provides a layered software structure that provides for and enhances module processing autonomy using a unique, purpose driven communication framework design to provide for situationally dynamic distribution of data. One or more embodiments described herein provide a data memory structure for battery primary and secondary usages and recycling. For example, a state of health, cell state of charge, cell capacities, cell impedances and/or the like including combinations and/or multiples thereof can be stored and recalled for identifying and tracking a root cause of battery failure. One or more embodiments described herein provide an expanded application layer software design for module management units and a controller. One or more embodiments described herein provide for signal transmission, storage, and processing for the application layer software.

Turning now to the figures, FIG. 1 schematically illustrates a management system 10 for managing a rechargeable energy storage device 12 in an electric vehicle 15, which may be partially electric or fully electric. The electric vehicle 15 may be a mobile platform, such as, but not limited to, a passenger vehicle, sport utility vehicle, light truck, heavy duty vehicle, ATV, minivan, bus, transit vehicle, bicycle, moving robot, farm implement (e.g. tractor), sports-related equipment (e.g. golf cart), boat, plane, and train. It is to be understood that the electric vehicle 15 may take many different forms and have additional components.

Referring to FIG. 1, the rechargeable energy storage device 12 includes one or more battery packs ("one or more" omitted henceforth) such as battery pack 14, each having a plurality of modules 20. According to an embodiment, a single module (e.g., one of the plurality of modules 20) can contain multiple cells or can be reduced to a single cell or expanded as a whole battery pack. Referring to FIG. 1, the battery pack 14 includes first, second, third and fourth modules 22, 24, 26, 28. Referring to FIG. 1, each of the plurality of modules 20 includes one or more respective cells 44 connected for current flow between a first terminal 46 and a second terminal 48. The respective cells 44 may include battery cells having different chemistries, including but not limited to, lithium-ion, lithium-iron, nickel metal hydride and lead acid batteries. The number of cells per module and the number of modules per battery pack may be varied based on the application at hand.

A respective module management unit 30 is embedded in each of the plurality of modules 20. The respective module management unit 30 is configured to measure one or more local parameters, which may pertain to the module as a whole or the respective cells 44 in the module. The local parameters may include voltages from each of its respective cells 44, module current and module temperature. Referring to FIG. 1, the first, second, third and fourth modules 22, 24, 26, 28 respectively incorporate first, second, third and fourth module management units 32, 34, 36, and 38. Each of the respective module management units 30 is embedded in the plurality of modules 20 through respective microcircuits 35. The respective microcircuits 35 are an assembly of electronic components, with a core embodied by a microcontroller and including a communication interface, such as a wired communication interface (e.g., Ethernet, universal serial bus (USB), and/or the like including combinations and/or multiples thereof), a wireless communication interface (e.g., radio frequency, Bluetooth, WiFi, and/or the like including combinations and/or multiples thereof), a controller area network (CAN) communication interface. It is to be understood that the respective microcircuits 35 may be fabricated as a single unit/chip or as multiple combined units/chips. The respective microcircuits 35 include an associated memory 37 and an associated processor 39. The respective module management unit 30 may include an integrated electronic controls unit, such as an application-specific integrated circuit (ASIC), a field-programmable gate array (FPGA), and/or the like, including combinations and/or multiples thereof.

Still referring to FIG. 1, a pack communicator 40 may be configured to interface wired and/or wirelessly with the respective module management unit 30, via a wireless network 42, which may be a short-range network or a long-range network. The wireless network 42 may be a Wireless Local Area Network (LAN) which links multiple devices using a wireless distribution method, a Wireless Metropolitan Area Networks (MAN) which connects several wireless LANs or a Wireless Wide Area Network (WAN) which covers large areas such as neighboring towns and cities. The wireless network 42 may be WIFI or a Bluetooth™ connection, defined as being a short-range radio technology (or wireless technology) aimed at simplifying communications among Internet devices and between devices and the Internet. Bluetooth™ is an open wireless technology standard for transmitting fixed and mobile electronic device data over short distances and creates personal networks operating within the 2.4 GHz band. Other types of connections may be employed.

The management system 10 includes a supervisory controller C configured for two-way communication with the respective management units 30. The supervisory controller C (also referred to as "controller C") may be an integral portion of, or a separate module operatively connected to, other controllers of the electric vehicle 15. In one example, the supervisory controller C is embedded as a layer in a vehicle integration control module (VICM) of an electric vehicle. Referring to FIG. 1, the pack communicator 40 is linked or connected to the supervisory controller C via at least one wired and/or wireless communication BUS 50, which may be a serial communication BUS in the form of a local area network. The local area network may include, but is not limited to, a Controller Area Network (CAN), a Controller Area Network with Flexible Data Rate (CAN-FD).

Figure 6:
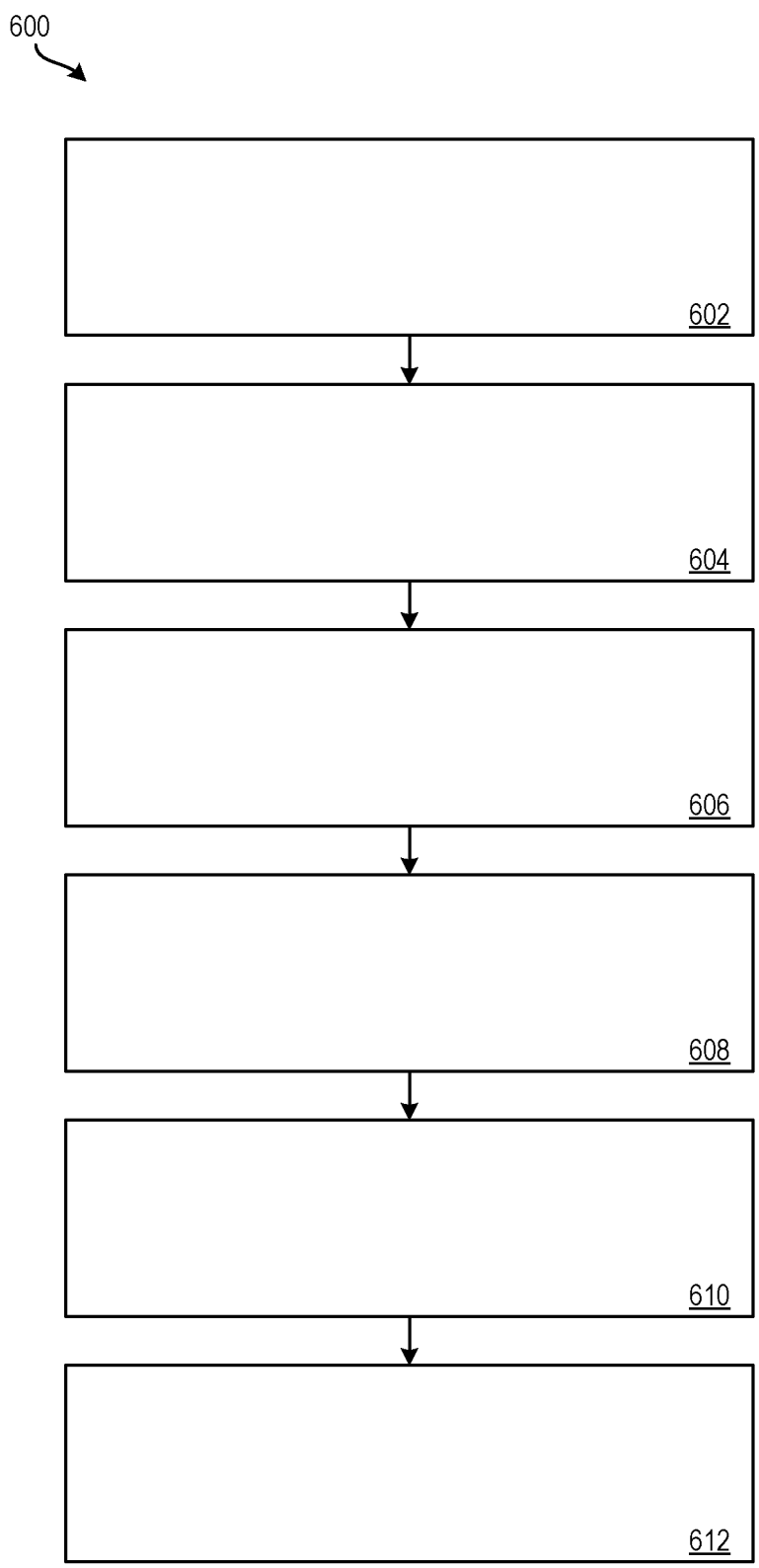
FIG. 6 is a block diagram of a method for distributed battery management for a vehicle according to one or more embodiments described herein.

The supervisory controller C includes at least one processor P and at least one memory M (or non-transitory, tangible computer readable storage medium) on which instructions are recorded for executing a method, such as the method 600 of FIG. 6, described further herein. The memory M can store executable instruction sets, and the processor P can execute the instruction sets stored in the memory M.

The management system 10 is characterized by a functional partition between the respective management units 30 and the supervisory controller C. In other words, the respective management units 30 and the supervisory controller C may perform mutually exclusive functions. The respective management unit 30 is configured to receive the pack current from the supervisory controller C, and to measure and monitor respective voltages from each of its respective cells 44, as well as the temperature of the module and respective cells 44. The respective management unit 30 may determine one or more local parameters, which may include a respective maximum and minimum module voltages, module state of charge, module capacity, cell state of charge, a respective cell state of health if a weaker cell is detected, an allowable module voltage limit and an allowable module current limit. The supervisory controller C is configured to receive the one or more local parameters, determine one or more global pack parameters based in part on the one or more local parameters and transmit the one or more global pack parameters back to the respective management units 30.

The supervisory controller C is configured to control operation of the rechargeable energy storage device 12 based in part on the one or more global pack parameters. The global pack parameters may include a respective power estimation for the battery pack 14, a cell balancing target, a pack state of charge, a pack capacity, a weak cell state of health monitoring function, and/or the like, including combinations and/or multiples thereof. The supervisory controller C may flag a weak cell (based on data provided by the respective management unit 30) and follow up or track its state of health via the weak cell state of health monitoring function. The acceptable threshold for defining a "weak" cell may be varied based on the application at hand and may include a predefined minimum capacity. The supervisory controller C may control battery charging current and voltage and time based on one or more global parameters, such as pack voltage, temperature and current limits, and state of health of a weaker cell. Additionally, the global pack parameters may be consumed as data by other controllers in the electric vehicle 15. According to one or more embodiments described herein, as shown in FIG. 1, the system 10 includes at least two pack sensors 60, 62. The pack sensors are configured to detect and transmit a pack voltage, a pack current, and/or temperature of the battery pack 14 to the supervisory controller C.

The respective module management unit 30 may be configured to store local parameters (e.g., module manufacture series numbers, module chemistry profile, module state of charge, module capacity, and module and/or associated cell state of health parameters, and/or the like, including combinations and/or multiples thereof) in their respective microcontroller memory 37. Thus, in the event one of the plurality of modules 20 requires servicing, a diagnostic scan tool or module repair tool may work directly with the respective module management unit 30 for service based on these parameters. A refurbished module may be updated with these parameters through the respective module management unit 30 during a module rebuild, such that when it is reassembled back into the battery pack 14, it is immediately ready to work with the supervisory controller C without further testing and/or calibration.

Figure 2A:
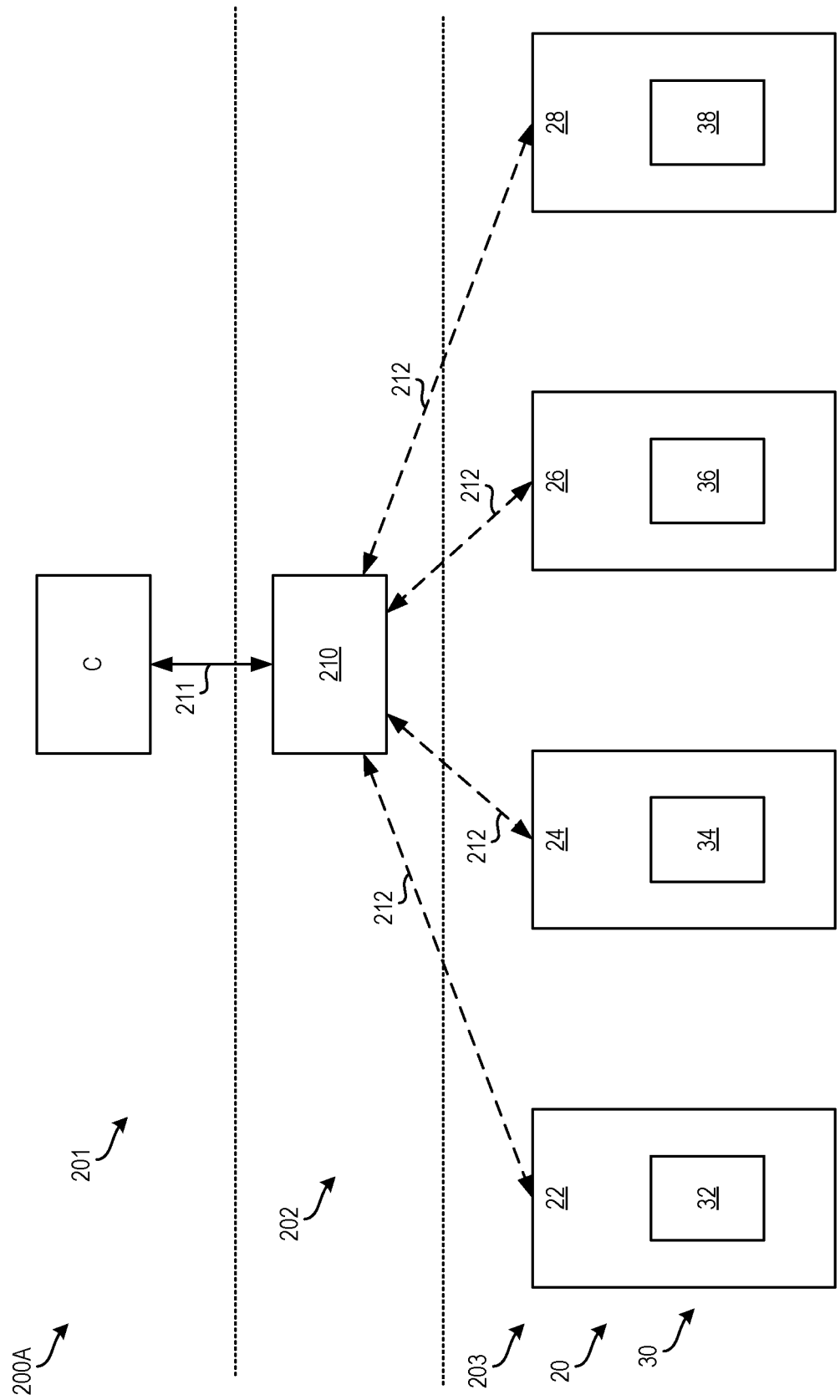
FIG. 2A is a block diagram of a distributed battery management for a vehicle according to one or more embodiments described herein.
Figure 2B:
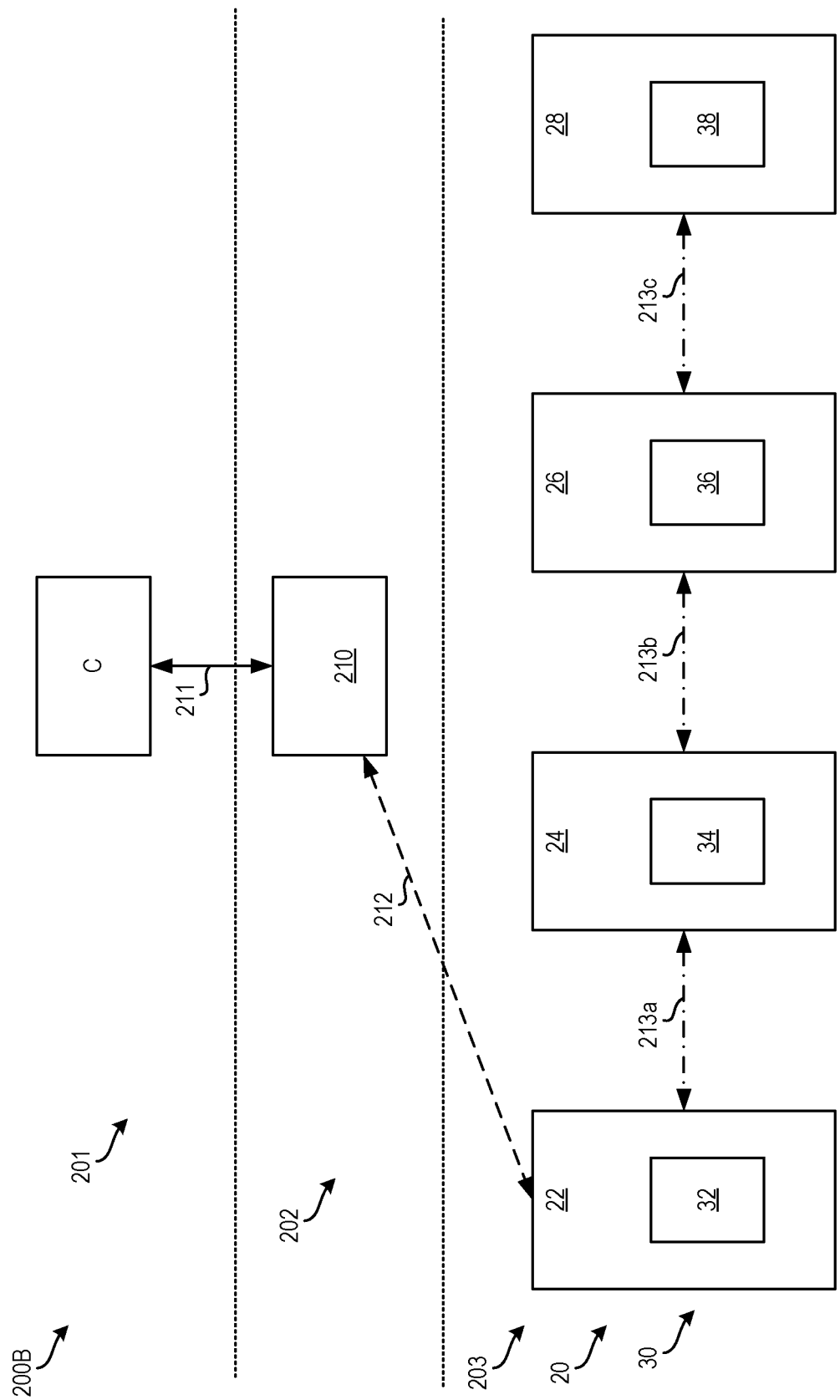
FIG. 2B is a block diagram of a distributed battery management for a vehicle according to one or more embodiments described herein.

FIGS. 2A and 2B depict different embodiments of distributed battery management systems 200A, 200B respectively according to one or more embodiments described herein. The systems 200A, 200B implement a multi-layer control scheme for distributed battery management. The multi-layer control scheme provides a layered software structure that provides for and enhances module processing autonomy using a unique, purpose driven communication framework design to provide for situationally dynamic distribution of data. The multi-layered control scheme includes a first layer 201, a second layer 202, and a third layer 203. The first layer 201 is a control layer where the controller C resides and provides supervisory control of the distributed battery management systems 200A, 200B, charging control management, total battery pack power/energy summation, and/or the like including combinations and/or multiples thereof. The third layer 203 is a module-level layer where the module management units 30 reside. According to one or more embodiments described herein, the module management units 30 can provide edge computing capabilities within the third layer 203 without having to transmit data to the controller C within the first layer 201. The second layer 202 is an intermediate layer that provides for data buffering, data transmission, data pre-processing, and/or the like including combinations and/or multiples thereof.

In FIG. 2A, the distributed battery management system 200A includes the controller C and the first, second, third and fourth module management units 32, 34, 36, and 38 each being associated respectively with the first, second, third and fourth modules 22, 24, 26, 28. The system 200 also includes a battery radio frequency module (BRFM) 210 communicatively disposed between the controller C and each of the first, second, third and fourth module management units 32, 34, 36, and 38. According to one or more embodiments described herein, one of the module management units 30 can be reduced to a single cell or expanded as a whole battery pack. According to one or more embodiments described herein, one of the module management units 30 can be placed on one of the plurality of modules 20 (e.g., the module management unit 32 can be placed on the module 22), where the one of the plurality of modules 20 includes several cells. According to one or more embodiments described herein, the one of the plurality of modules 20 can include one cell. According to one or more embodiments described herein, the one of the plurality of modules 20 can be defined as a battery pack that includes multiple cells (e.g., hundreds of cells).

According to one or more embodiments described herein regarding FIGS. 2A and 2B, the controller C is communicatively coupled to the BRFM 210 via a suitable wired and/or wireless connection. For example, the controller C can be communicatively coupled, via a link 211, to the BRFM 210 via a CAN communication interface. The controller C can send data to and/or receive data from the BRFM 210. The controller C provides a first layer of control According to the embodiment (e.g., the system 200A of FIG. 2A), the BRFM 210 is communicatively coupled to each of the first, second, third and fourth module management units 32, 34, 36, and 38 via a suitable wired and/or wireless connection. For example, the BRFM 210 can be communicatively coupled, via links 212, to each of the first, second, third and fourth module management units 32, 34, 36, and 38 via a radio frequency communication interface. The BRFM 210 can send data to and/or receive data from each of the first, second, third and fourth module management units 32, 34, 36, and 38. As an example, the BRFM 210 can send a present current ($I_{present}$), a state of charge target ($SOC_{target}$), and/or the like including combinations and/or multiples thereof to the module management units 30 via the links 212. The module management units 30 can send temperature (T), voltage (V), cell state of charge ($SOC_{cell}$), cell state of health ($SOH_{cell}$), and/or the like including combinations and/or multiples thereof to the BRFM 210 via the links 212.

According to the embodiment (e.g., the system 200B of FIG. 2B), the BRFM 210 is communicatively coupled to one of the first, second, third and fourth module management units 32, 34, 36, and 38 (e.g., the first module management unit 32) via a suitable wired and/or wireless connection. For example, the BRFM 210 can be communicatively coupled, via the link 212, to the first module management unit 32 via a radio frequency communication interface. The BRFM 210 can send data to and/or receive data from the first module management unit 32 directly and can send data to and/or receive data from the second, third and fourth module management units 34, 36, and 38 indirectly via the first module management unit 32. For example, the BRFM 210 can send data to the first module management unit 32 via the link 212 as shown in FIG. 2B. The first module management unit 32 can then relay the data to the second module management unit 34 via the link 213a. Similarly, the second module management unit 34 can relay the data to the third module management unit 36 via the link 213b, and the third module management unit 36 can relay the data to the fourth module management unit 38 via the link 213c. The link 212 and the links 213a-213c are bi-directional in that data can be transmitted from any of the first, second, third and fourth module management units 32, 34, 36, and 38 to the BRFM 210. According to one or more embodiments described herein, the link 212 can be a wired link (e.g., CAN) and the links 213 can be wireless links (e.g., radio frequency). As an example, the BRFM 210 can send a present current (I present), a state of charge target ($SOC_{target}$), and/or the like including combinations and/or multiples thereof to the first module management unit 32 via the links 212, which the first module management unit 32 can then relay to one or more of the second, third, and/or fourth module management units 34, 36, 38 as shown in FIG. 2B. The second, third, and/or fourth module management units 34, 36, 38 can send temperature (T), voltage (V), cell state of charge ($SOC_{cell}$), cell state of health ($SOH_{cell}$), and/or the like including combinations and/or multiples thereof to the first module management unit 32 via the links 213 as shown in FIG. 2B. The first module management unit 32 can relay that information (and/or send its own such information) to the BRFM 210 via the link 212.

The BRFM 210 is an intelligent, distributed, bi-directional controller that can connect by wired and/or wireless links, as shown, to the module management units 30 and to the controller C, which is a supervisory controller. As shown, the BRFM 210 can implement a star communication configuration (see FIG. 2A) or a daisy chain communication configuration (see FIG. 2B). The BRFM 210 can dynamically process and selectively transmit data (e.g., signals) to the controller C and/or to one or more of the module management units 30.

According to one or more embodiments described herein, the module management units 30 can measure a voltage, a current, and a temperature associated with the one or more respective cells 44, can perform cell balancing (e.g., make a decision of which cell to use at a particular time or for a particular operating condition), can monitor state of health and state of charge of the one or more respective cells 44, can measure power of the plurality of modules 20, can measure energy of the plurality of modules 20, can estimate a capacity of the one or more respective cells 44, and can perform edge computing (e.g., decision making).

Figure 3:
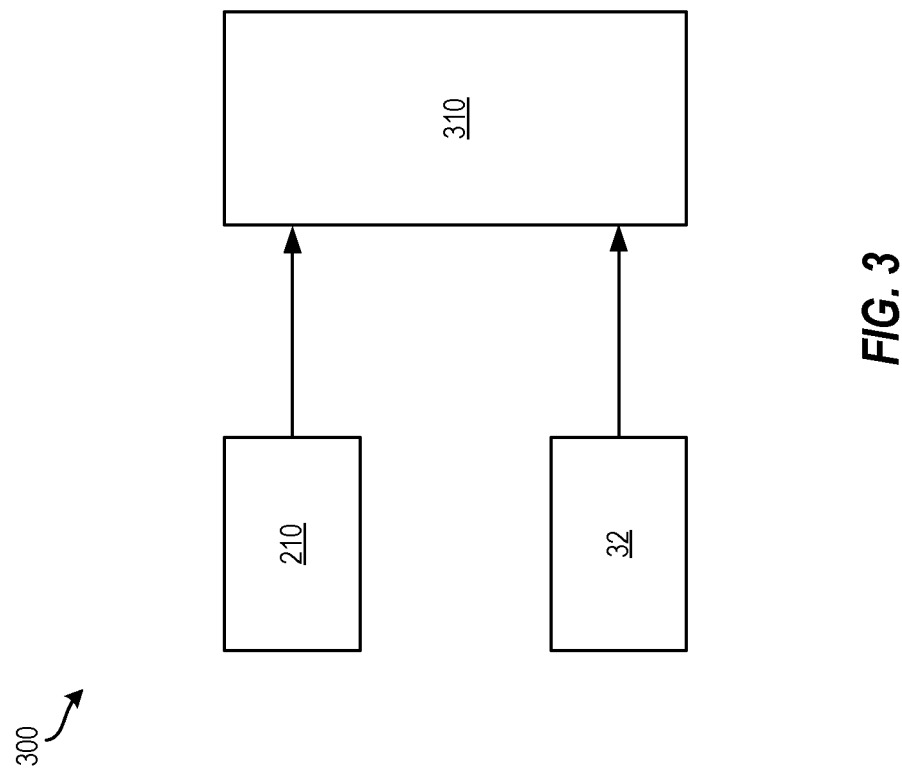
FIG. 3 depicts a system for memory allocation according to one or more embodiments described herein.

One or more embodiments provides for memory allocations for different types of static and dynamic battery parameters. For example, FIG. 3 depicts a system 300 for memory allocation according to one or more embodiments described herein. The system 300 includes the BRFM 210 and at least one of the module management units 30 (e.g., the first module management unit 32). According to one or more embodiments described herein, each of the BRFM 210 and the first module management unit 32 can save data to respective memories. For example, the BRFM 210 can include a volatile memory (e.g., a flash memory, a random access memory, and/or the like, including combinations and/or multiples thereof) (not shown) to dynamically store and transmit signals received from the module management units 30 and/or the controller C. The module management units 30 can include, for example, a volatile memory (e.g., a flash memory, a random access memory, and/or the like, including combinations and/or multiples thereof) (e.g., the microcontroller memory 37) to store data, such as voltages, state of charge, temperatures, capacities, and/or the like, including combinations and/or multiples thereof. Alternatively or additionally, the module management units 30 can include, for example, a non-volatile memory (e.g., electrically erasable programmable read-only memory (EEPROM)) to store the data, such as to the table 310.

The module management units 30 use the dedicated non-volatile memory to store data to the table 310, for example and include logic to recall unique module information. The data and/or unique module information can include, for example, state of health information, battery chemistry information, manufacture identifier information for battery first use, secondary use information, special event information such as thermal runaway (TR), recycling information, and/or the like, including combinations and/or multiples thereof.

An example of the table 310 is as follows, but is not so limited:

| | Number of Parameters | Bytes/Unit | Total Bytes |
|---|---|---|---|
| State of Health | 2 | 4 | 4 |
| Cell Capacity | 1 | 2 | 2 |
| Other Fault | 2 | 1 | 2 |
| Diagnostic History | 6 | 2 | 12 |
| Chemistry Code | 2 | 2 | 4 |
| Manufacture ID | 1 | 2 | 1 |
| | | Total | 26 bytes |

According to one or more embodiments described herein, the state of health and cell capacities can be dynamically stored and recalled for a variety of vehicle or non-vehicle battery management system application, such as matching repaired or replacement modules to an existing vehicle battery pack, secondary use after original vehicle life (e.g., forming a stationary electrical grid pack), and/or the like, including combinations and/or multiples thereof.

According to one or more embodiments described herein, the table 310 captures unique identifying information, such as manufacture ID, cathode and anode chemistry codes for material recycling, total number of charge/discharge cycles, and/or the like, including combinations and/or multiples thereof.

Figure 4:
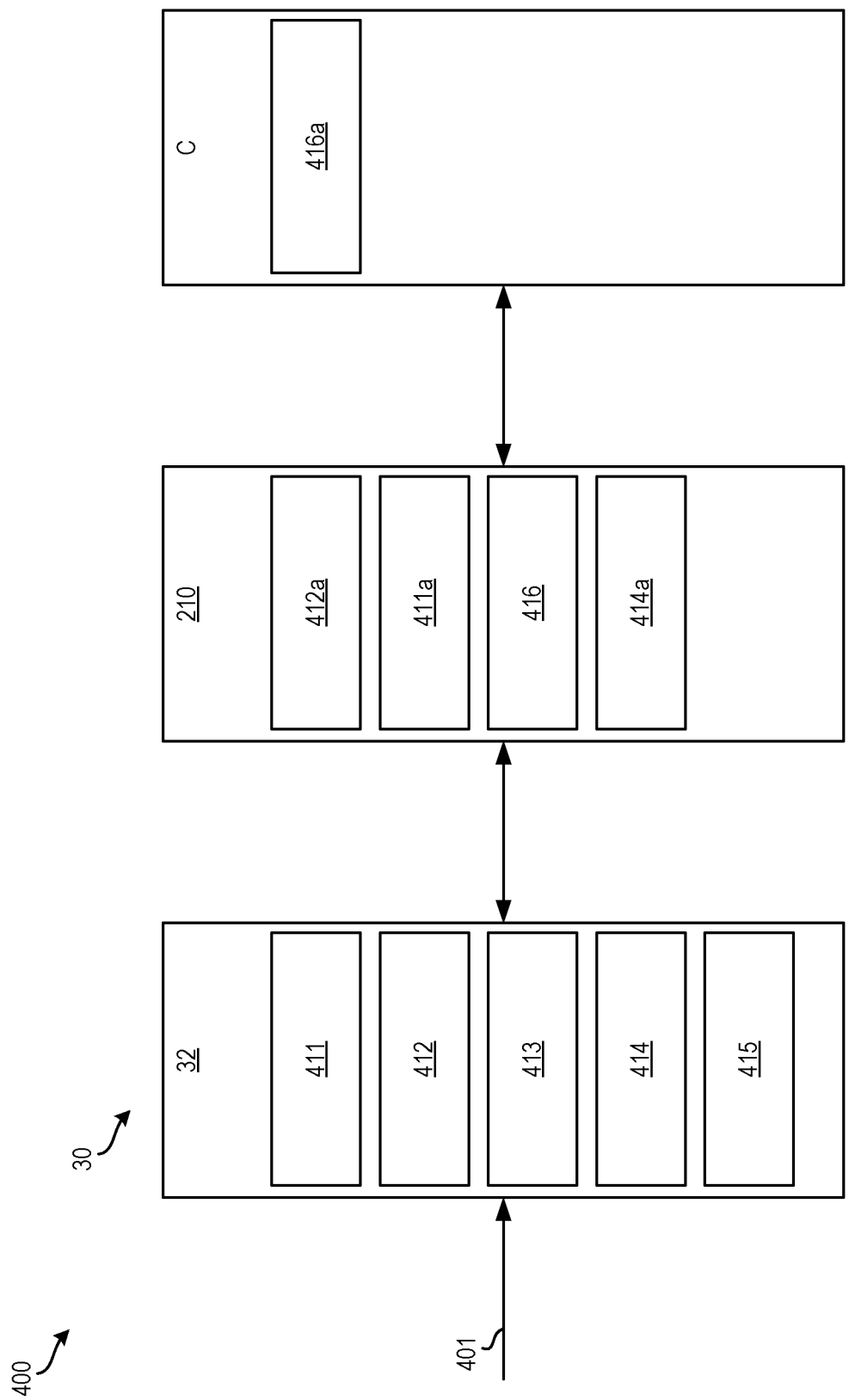
FIG. 4 depicts a block diagram of a distributed application layer architecture across the distributed battery management systems of FIGS. 2A, 2B, according to one or more embodiments described herein.

FIG. 4 depicts a block diagram of a distributed application layer architecture 400 across the distributed battery management systems 200A, 200B of FIGS. 2A, 2B respectively, according to one or more embodiments described herein. In this embodiment, functions are distributed among the module management units 30 (e.g., the first module management unit 32), the BRFM 210, and the controller C as shown, although other distributions are also possible. The distributed application layer architecture 400 provides functionality such as individual cell level low voltage and temperature diagnostics, cell impedance measurements at the module management unit level, cross-signal transmission checks in the BRFM 210 for wireless communication, and/or the like, including combinations and/or multiples thereof.

One or more of the module management units (e.g., the first module management unit 32) receives battery cell parameter measurements 401. These can include voltage (V), temperature (T), and/or current (I) values for one or more cells. According to an embodiment, based on the battery cell parameter measurements 401, the distributed application layer architecture 400 can implement one or more functions 411-417 as shown.

According to an embodiment, one or more of the module management units (e.g., the first module management unit 32) implements the functions 411-415. The function 411 can include performing a function of cell voltage, temperature, and current measurements, such as storing the cell voltage, temperature, and current measurements. The function 412 can include performing calculations. Examples of such calculations of the function 412 can include calculations of $V_{module}$, $V_{min}\{V_i\}$, $V_{max}\{V_i\}$, and $V_{mean}\{V_i\}$; calculations of $SOC_i(k)$, $SOC_{min}$, $SOC_{max}$; calculation of $SOP(k)$; calculation of module energy; calculation of cell electrochemical impedance scope (EIS); and/or the like, including combinations and/or multiples thereof. The function 413 can include diagnosis of cell voltage, diagnosis of cell temperature, diagnosis based on cell EIS, and/or the like, including combinations and/or multiples thereof. The function 414 can include a function of periodically storing and recalling SOH, capacity, diagnosis history, chemistry code, manufacture code, and/or the like, including combinations and/or multiples thereof (see, e.g., table 310). The function 414 can additionally or alternatively include a function of storing parameters such as cell voltage and temperatures during a special event such as TR. The function 415 can include a function of transmitting a signal to the BRFM 210.

According to an embodiment, the BRFM 210 can receive information, such as the signal from function 415, the cell parameter measurements, and/or the like, including combinations and/or multiples thereof, from one or more of the module management units (e.g., the first module management unit 32), and can perform the functions 412a, 411a, 416, and 414a. The function 412a can include a function of receiving and dynamically storing transmitted module signals (e.g., signals from one or more of the module management units 30). The function 411a can include a function of receiving and dynamically storing transmitted signals from the controller C. The function 416 can include a function of transmitting selected module signals to the controller C. The function 414a can include the function of transmitting a signal from the controller C to one or more of the module management units 30.

According to an embodiment, the controller C can receive information, such as the signal from function 416, the cell parameter measurements, and/or the like, including combinations and/or multiples thereof, from the BRFM 210, and can perform the function 416a. The function 416a can include updating a function in the controller C. For example, the function 416a can include updating battery pack voltage management based on $V_{module}$, $V_{min}\{V_i\}$, $V_{max}\{V_i\}$, and $V_{mean}\{V_i\}$ for example. As another example, the function 416a can include updating calculations of battery pack state of charge (SOC/SOP) SOH and energy based on module SOC, SOP, SOH, and energy. As another example, the function 416a can include updating voltage cross checks between the battery pack and module. According to one or more embodiments described herein, the controller C can perform other functions as well.

Figure 5:
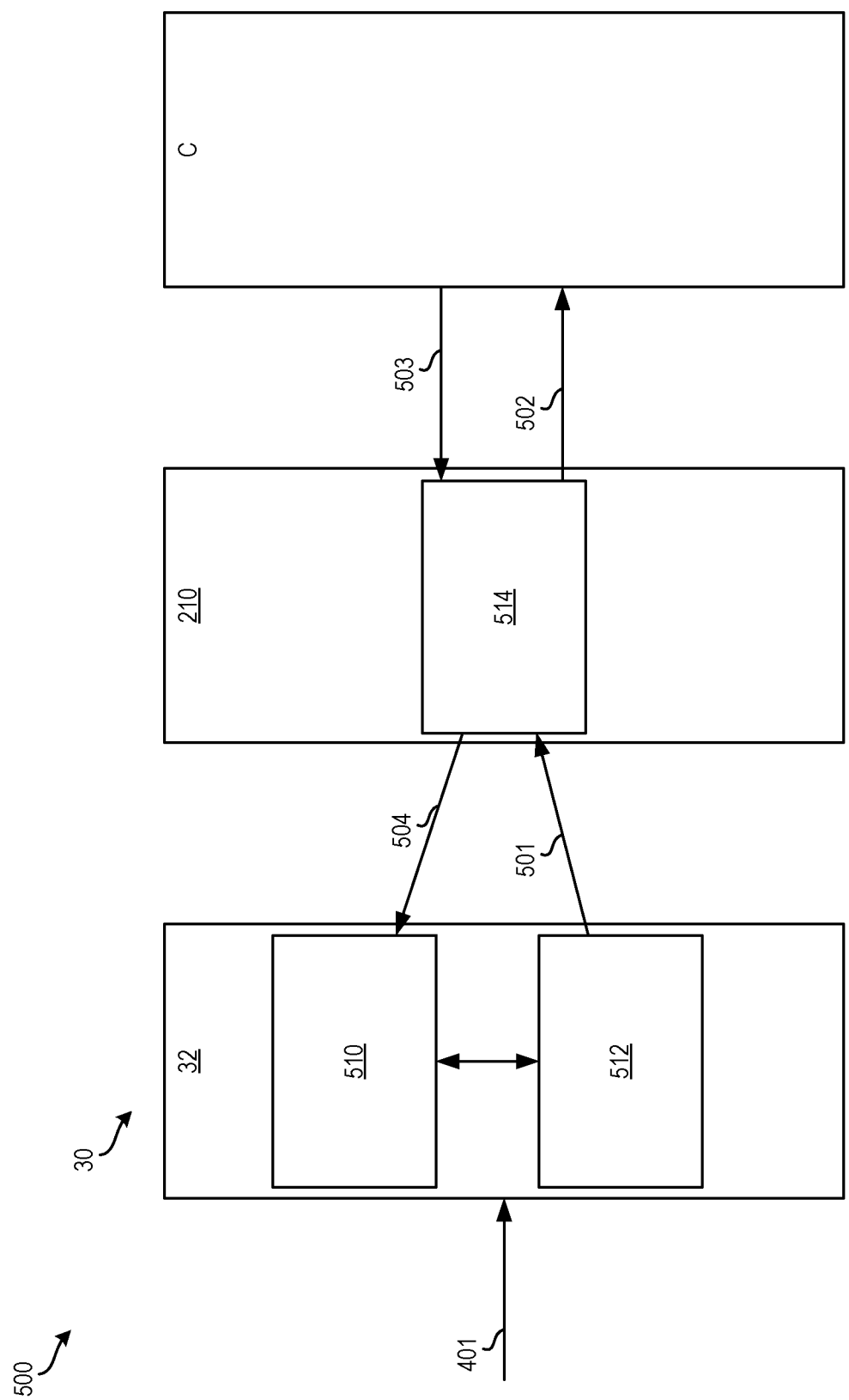
FIG. 5 depicts a block diagram of a distributed application layer architecture across the distributed battery management systems of FIGS. 2A, 2B respectively, according to one or more embodiments described herein.

FIG. 5 depicts a block diagram of a distributed application layer architecture 500 across the distributed battery management systems 200A, 200B of FIGS. 2A, 2B respectively, according to one or more embodiments described herein. In FIG. 5, the distributed application layer architecture 500 provides an approach for signal transmission, storage, and processing between module management units 30, the BRFM 210, and the controller C. In the embodiment of FIG. 5, the first module management unit 32 includes a non-volatile memory 510 (e.g., a persistent memory) and a volatile memory 512 (e.g., a non-persistent memory), and the BRFM 210 includes a volatile memory 514. Although not shown, the BRFM 210 may include a non-volatile memory according to one or more embodiments described herein. The controller C may also include a memory (not shown) (e.g., a persistent and/or non-persistent memory) according to one or more embodiments described herein (see, e.g., FIG. 1).

One or more of the module management units (e.g., the first module management unit 32) receives battery cell parameter measurements 401, which can be stored in the non-volatile memory 510 and/or the volatile memory 512. As described regarding FIG. 4, the first module management unit 32 can perform a function (e.g., one of the functions 411-415), such as calculating $V_i$, $V_{module}$, $V_{min}\{V_i\}$, $V_{max}\{V_i\}$, and $V_{mean}\{V_i\}$; calculations of $SOC_i(k)$, $SOC_{min}$, $SOC_{max}$; calculations of $SOP_i(k)$, $SOP_{i\_min}$, $SOP_{i\_max}$, cell voltage, temperature and EIS diagnosis, $SOH_i(k)$, and/or the like, including combinations and/or multiples thereof. The value "k" represents a number of battery cells. The value "$v_i$" is an on demand ID voltage cross check fail. This can be repeated for each of the module management units. Results of the performed function(s) can be sent as a signal 501 (e.g., via the link 212) to the volatile memory 514 of the BRFM 210. According to an embodiment, the results can be relayed by the BRFM 210 to the controller C via a signal 502 (e.g., via the link 211). The controller C can send a battery pack current i(t), a SOC balance target, and/or the like, including combinations and/or multiples thereof, to the BRFM 210 as a signal 503 (e.g., via the link 211). The BRFM 210 can send the battery pack current i(t), the SOC balance target, and/or the like, including combinations and/or multiples thereof, to the module management unit 32 via a signal 504 (e.g., via the link 212).

FIG. 6 depicts a flow diagram of a method 600 for distributed battery management for a vehicle according to one or more embodiments described herein. It should be appreciated that the method 600 can be performed by any suitable system or device such as the system 200A and/or the system 200B, or any other suitable processing system and/or processing device (e.g., a processor). The method 600 is now described with reference to one or more aspects of FIGS. 1-5 but is not so limited.

At block 602, a module management unit (e.g., the first module management unit 32) associated with a battery cell (e.g., the respective cells 44) receives a battery cell parameter measurement (e.g., the battery cell parameter measurements 401) associated with the battery cell. The module management unit in is communication with a battery radio frequency module (e.g., the BRFM 210) via a first link (e.g., the link 212). At block 604, the module management unit performs a first function (e.g., one or more of the functions 411-415) based at least in part on the battery cell parameter measurement to generate a first signal. At block 606, the module management unit transmits the first signal to the battery radio frequency module via the first link. At block 608, the battery radio frequency module performs a second function (e.g., one or more of the functions 412a, 411a, 416, 414a) based at least in part on the first signal to generate a second signal. At block 610, the battery radio frequency module transmits the second signal to a controller (e.g., the controller C). At block 612, the controller performs a third function (e.g., the function 416a) based at least in part on the third signal.

Additional processes also may be included, and it should be understood that the process depicted in FIG. 6 represents an illustration and that other processes may be added or existing processes may be removed, modified, or rearranged without departing from the scope and spirit of the present disclosure.

The descriptions of the various examples of the present disclosure have been presented for purposes of illustration but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A method for distributed battery management of a vehicle, the method comprising:
   receiving, at a module management unit associated with a battery cell, a battery cell parameter measurement associated with the battery cell, wherein the module management unit in is communication with a battery radio frequency module via a first link;
   performing, by the module management unit, a first function based at least in part on the battery cell parameter measurement to generate a first signal, wherein the first function comprises performing a calculation on the battery cell parameter measurement;
   transmitting, from the module management unit, the first signal to the battery radio frequency module via the first link;
   performing, by the battery radio frequency module, a second function based at least in part on the first signal to generate a second signal;
   transmitting, from the battery radio frequency module, the second signal to a controller; and
   performing, by the controller, a third function based at least in part on the second signal.

2. The method of claim 1, wherein the module management unit is one of a plurality of module management units.

3. The method of claim 2, wherein the plurality of module management units are in communication with the battery radio frequency module via wireless links.

4. The method of claim 2, wherein one of the plurality of module management units is in communication with the battery radio frequency module via a wired link, and wherein the one of the plurality of module management units is in communication with at least one other of the plurality of module management units via a wired link.

5. The method of claim 1, further comprising transmitting, from the battery radio frequency module, the second signal to the module management unit.

6. The method of claim 1, wherein the first link is a direct link between the module management unit and the battery radio frequency module.

7. The method of claim 6, wherein the first link is a radio frequency link.

8. The method of claim 1, wherein the first link is a wired link between the module management unit and the battery radio frequency module via another module management unit.

9. The method of claim 1, wherein the module management unit is associated with a plurality of battery cells.

10. The method of claim 1, wherein the module management unit is associated with a battery pack, the battery pack comprising the battery cell.

11. The method of claim 1, wherein the first function processes the battery cell parameter measurement prior to transmitting the first signal to the battery radio frequency module, wherein the first signal is a result of processing the battery cell parameter measurement.

12. The method of claim 1, further comprising:
   transmitting, from the controller, a fourth signal including measured and calculated battery pack signals to the battery radio frequency module; and
   transmitting, from the battery radio frequency module, the fourth signal to the module management unit.

13. A system for distributed battery management of a vehicle, the system comprising:
   a first module management unit associated with a first battery cell and to perform a first function based at least in part on a first battery cell parameter measurement associated with the first battery cell, wherein the first function comprises performing a calculation on the battery cell parameter measurement;
   a second module management unit associated with a second battery cell and to perform a second function based at least in part on a second battery cell parameter measurement associated with the second battery cell;
a battery radio frequency module to perform a third function based at least in part on at least one of a first signal received from the first module management unit or a second signal received from the second module management unit; and
a controller to perform a fourth function based at least in part on a third signal received from the battery radio frequency module,
wherein the first module management unit is communicatively coupled to the battery radio frequency module via a first link,
wherein the second module management unit is communicatively coupled to the battery radio frequency module via a second link,
wherein the battery radio frequency module is communicatively coupled to the controller via a third link,
wherein the first signal is transmitted from the first module management unit to the battery radio frequency module via the first link,
wherein the second signal is transmitted from the second module management unit to the battery radio frequency module via the second link.

14. The system of claim 13, wherein the third signal is transmitted from the battery radio frequency module to the controller via the third link.

15. The system of claim 13, wherein the first link is a first radio frequency link, wherein the second link is a radio frequency link, and wherein the third link is a controller area network link.

16. The system of claim 13, wherein the first battery cell has a first battery chemistry type, and wherein the second battery cell has a second battery chemistry type that differs from the first battery chemistry type.

17. A system for distributed battery management of a vehicle, the system comprising:
a first module management unit associated with a first battery cell and to perform a first function based at least in part on a first battery cell parameter measurement associated with the first battery cell, wherein the first function comprises performing a calculation on the battery cell parameter measurement;
a second module management unit associated with a second battery cell and to perform a second function based at least in part on a second battery cell parameter measurement associated with the second battery cell;
a battery radio frequency module to perform a third function based at least in part on at least one of a first signal received from the first module management unit or a second signal received from the second module management unit; and a controller to perform a fourth function based at least in part on a third signal received from the battery radio frequency module,
wherein the first module management unit is communicatively coupled to the battery radio frequency module via a first link,
wherein the first module management unit is communicatively coupled to the second module management unit via a second link,
wherein the battery radio frequency module is communicatively coupled to the controller via a third link,
wherein the second signal is transmitted from the second module management unit to the first module management unit via the second link, and
wherein the first signal and the second signal are transmitted from the first module management unit to the battery radio frequency module via the first link.

18. The system of claim 17, wherein the third signal is transmitted from the battery radio frequency module to the controller via the third link.

19. The system of claim 17, wherein the first link is a wired link, wherein the second link is a radio frequency link, and wherein the third link is a controller area network link.

20. The system of claim 17, wherein the first battery cell has a first battery chemistry type, and wherein the second battery cell has a second battery chemistry type that differs from the first battery chemistry type.

* * * * *